E. I. BRADDOCK.
WIRE NAIL.
APPLICATION FILED FEB. 2, 1916.
1,193,503.
Patented Aug. 8, 1916.
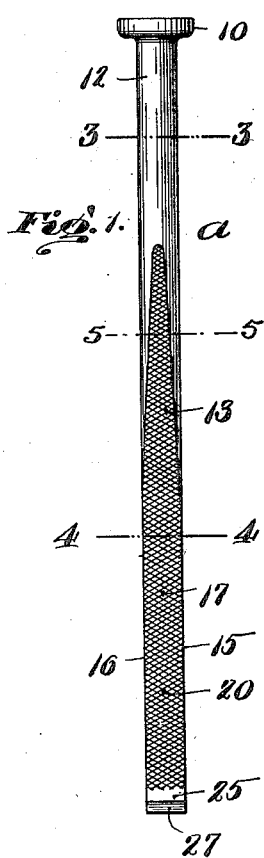
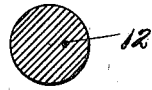
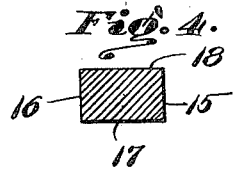
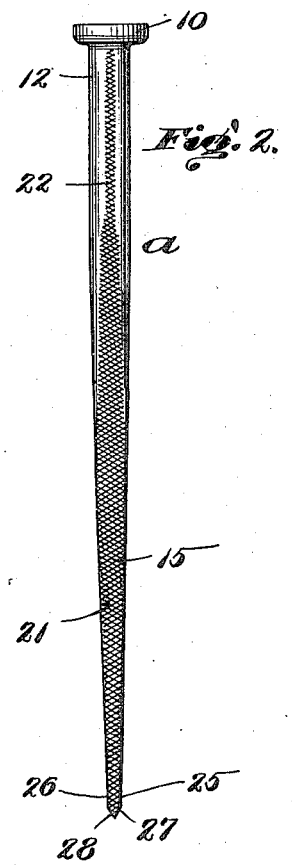
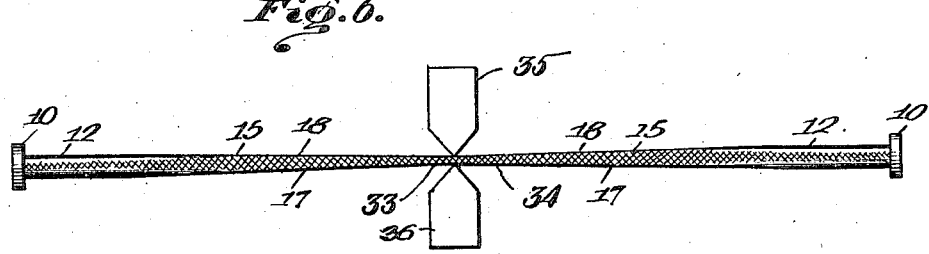
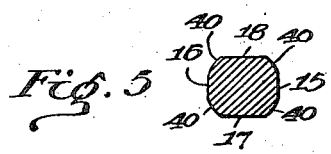
Inventor
Edward I. Braddock
by Jas. H. Churchill
Atty.

UNITED STATES PATENT OFFICE.

EDWARD I. BRADDOCK, OF WINCHESTER, MASSACHUSETTS.

WIRE NAIL.

1,193,503.  Specification of Letters Patent.  Patented Aug. 8, 1916.

Application filed February 2, 1916. Serial No. 75,831.

*To all whom it may concern:*

Be it known that I, EDWARD I. BRADDOCK, a citizen of the United States, and a resident of Winchester, in the county of Middlesex and State of Massachusetts, have invented an Improvement in Wire Nails, of which the following description, in connection with the accompanying drawings, is a specification, like characters on the drawings representing like parts.

This invention relates to a wire nail, and has for its object to provide a nail, which can be made from a continuous length of round wire at a material saving in cost over the ordinary round wire nail, which is of increased holding power and which is capable of being easily driven into wood without splitting the same. To this end, the nail is provided with a round or cylindrical portion of relatively short length from which extends a body portion of greater length than said cylindrical portion, said body portion being substantially rectangular in cross-section at portions of its length and provided with four sides, two opposing sides being straight and parallel and the two other opposing sides being tapered and diverging from near the point of the nail toward and merging with the cylindrical portion. The sides of the body portion may be knurled to increase the gripping or holding power of the nails, and the knurls on the parallel sides of the body portion may and preferably will be extended into the cylindrical portion, so as to serve as a guide for the operator to properly position the nail with relation to the material into which it is driven to avoid splitting the said material. The body portion of the nail may and preferably will be provided at its end with a chisel point, which is formed in a short section having parallel sides extended from the tapered sides of the body portion, to facilitate manufacture as will be described and also to facilitate entrance of the nail into wood or other material into which the nail is driven. These and other features of this invention will be pointed out in the claims at the end of this specification.

Figure 1 is a front elevation of a wire nail embodying this invention. Fig. 2, a side elevation of the nail shown in Fig. 1. Fig. 3, an enlarged cross-section on the line 3—3, Fig. 1. Fig. 4, an enlarged cross section on the line 4—4, Fig. 1, Fig. 5, an enlarged cross section on the line 5—5, Fig. 1, and Fig. 6, a detail in plan of a blank to illustrate the manner of making the nail shown in Fig. 1.

Referring to the drawing, *a* represents the improved nail, which is made from round wire and is provided with a head 10, a cylindrical portion 12 adjacent said head, and a body portion 13, which is of materially greater length than the cylindrical portion 12. The body portion 13 has two of its opposing sides 15, 16, parallel and straight and separated by a distance substantially equal to the diameter of the cylindrical portion 12, and the remaining two opposing sides 17, 18, are made tapering and diverge from near the point of the nail and merge with the cylindrical portion 12. The diverging sides 17, 18, gradually diminish in width from the full diameter of the cylindrical portion 12 to a thickness materially less than said diameter, which is effected by drawing or rolling out the cylindrical wire, so that a material saving in stock over the ordinary wire nail is obtained without so weakening the nail near its longitudinal center or middle portion as to cause it to buckle or bend when driven into wood or other material. The tapered sides 17, 18 may be knurled as indicated by the cross lines 20, and preferably the straight parallel sides 15, 16, are also knurled as indicated by the cross lines 21, and it is preferred to knurl the cylindrical portion 12 in line with the nurling 21, or, in other words, to extend the nurling 21 into the cylindrical portion 12, as indicated by the cross lines 22. The nurling 20, 21, materially increases the gripping or holding power of the nail, and the nurling on the tapered sides assists the latter in obtaining an increased grip on the wood or other material.

The tapered or diverging sides 17, 18, coupled with the straight parallel sides 15, 16, impart to the wire nail all the penetrating and holding powers of the ordinary cut nail, and the nurling 22 on the cylindrical portion 12 serves as a guide for the operator to properly present the pointed end of the nail cross-wise of the grain of the wood and further the straight parallel sides 15, 16, also impart to the nail the non-splitting property of the cut nail. The tapering sides 17, 18, preferably terminate in or merge with substantially short sections having parallel surfaces 25, 26, which are cut at their ends to form beveled surfaces 27, 28, which extend from the straight side 15 to the straight side 16 and impart to the nail a chisel point, which facilitates easy entrance of the nail into the wood. The short parallel surfaces 25, 26, also facilitate entrance into the wood and, in addition, assist in the manufacture of the nail, as they afford a substantial length of material at which one nail may be severed from the next nail blank, and thereby allow a leeway for the elongation of the tapered body portion 13 in the manufacture of the nails from a continuous length of wire. This is illustrated in Fig. 5, wherein a section of wire has been treated by the machine, not shown, to form a blank for two nails, which are complete except as to being severed to form the point. The length of the parallel surfaces 25, 26, of the two attached nails is indicated by the distance between the lines 33, 34, and it is designed that the section of wire should be severed by the cutters 35, 36, between the lines 33, 34, which action is the final action in the machine and forms the chisel points for two nails. It will therefore be seen, that by providing the parallel surfaces between the lines 33, 34, a very considerable leeway is provided for insuring that some portion of these surfaces will be brought into position to be severed by the cutters or knives 35, 36, which form the points of the nails, thereby compensating for any irregularity in the feed or elongation of the wire when the tapered sides 17, 18, are formed.

Claims:

1. A wire nail having a cylindrical portion provided at one end with a head of greater diameter than said cylindrical portion and having extended from it a body portion of greater length than said cylindrical portion and provided with two opposing sides which are straight and parallel and separated a distance substantially equal to the diameter of said cylindrical portion, and having the other two opposing sides tapering and diverging from near the point of the nail toward and merging with the said cylindrical portion.

2. A wire nail having a cylindrical portion provided at one end with a head of greater diameter than said cylindrical portion and having extended from it a body portion of greater length than said cylindrical portion and provided with two opposing sides which are straight and parallel and separated a distance substantially equal to the diameter of said cylindrical portion, and having the other two opposing sides tapering and diverging from near the point of the nail toward and merging with the said cylindrical portion, said tapering sides merging near the point of the nail with substantially parallel surfaces which terminate in beveled surfaces to form a chisel point.

In testimony whereof, I have signed my name to this specification.

EDWARD I. BRADDOCK.